United States Patent
Bargain

[11] 3,910,859
[45] Oct. 7, 1975

[54] HEAT-STABLE POLYIMIDE RESIN FROM BIS-IMIDE, POLYAMINE AND ALAZINE

[75] Inventor: Michel Bargain, Lyon, France

[73] Assignee: Rhone-Poulenc S.A., Paris, France

[22] Filed: Mar. 5, 1974

[21] Appl. No.: 448,261

Related U.S. Application Data

[63] Continuation-in-part of Ser. No. 228,232, Feb. 22, 1972.

[52] U.S. Cl.......... 260/47 UA; 117/161 P; 161/227; 260/37 N; 260/42.18; 260/47 CZ; 260/78 UA; 260/785 C; 260/857 PA
[51] Int. Cl.² .................................... C08G 69/26
[58] Field of Search...... 260/78 UA, 47 UA, 47 CZ, 260/47 CP, 857 UN

[56] References Cited
UNITED STATES PATENTS

| | | | |
|---|---|---|---|
| 3,562,223 | 2/1971 | Bargain et al. | 260/78 UA |
| 3,652,511 | 3/1972 | Vincent et al. | 260/78 UA |
| 3,679,639 | 7/1972 | Bargain et al. | 260/78 UA |

OTHER PUBLICATIONS
Stille et al., – Journal of Polymer Science, Part A, Vol. 2, 1964, pp. 1487-91.

*Primary Examiner*—Harold D. Anderson
*Attorney, Agent, or Firm*—Stevens, Davis, Miller & Mosher

[57] ABSTRACT
New heat-stable resins are provided having good mechanical and electrical properties combined with chemical inertness at temperatures of 200° to 300°C, which resins are resins of a three-dimensional polyimide which is obtained by reacting, at between 50° and 350°C, a bisimide of the general formula:

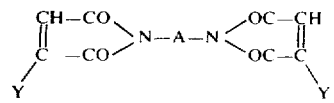

in which Y denotes H, $CH_3$ or Cl, and A represents a divalent organic radical possessing at least two carbon atoms, a polyamine of the general formula:

$$R(NH_2)_x$$

in which $x$ represents an integer at least equal to 2 and R denotes an organic radical of valency $x$, and an alazine of the general formula:

$$G - CH = N - N = CH - G$$

in which G represents a monovalent aromatic radical, and an anhydride of a tricarboxylic or tetracarboxylic aromatic acid, in amounts such that if $N_1$ represents the number of mols of bis-imide employed, $N_2$ represents the number of mols of polyamine employed and $N_3$ represents the number of mols of alazine employed, the ratio

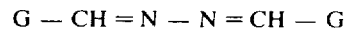

is at least 1.3, $x$ being defined as above.

22 Claims, No Drawings

HEAT-STABLE POLYIMIDE RESIN FROM BIS-IMIDE, POLYAMINE AND ALAZINE

This application is a continuation-in-part application of my U.S. Ser. No. 228,232 filed Feb. 22 1972.

The present invention relates to new heat-stable resins based on three-dimensional polyimides.

French Pat. No. 1,555,564 describes heat-curable resins obtained by reacting a N,N'-bis-imide of an unsaturated dicarboxylic acid with a di-primary diamine; the reactants are used in approximately equimolar proportions or with an excess of bis-imide.

Furthermore linear polymers are known which are obtained by heating a bis-maleimide with benzalazine, the reactants being used in stoichiometric amounts or with a molar excess of bis-imide; the crude polymer is then washed with chloroform and acetone [see Stille and Anyos, J. Polym. Sci. A - Vol. 2, page 1487 (1964)]. The authors further indicate that the viscosity of the crude polymers decreases during prolonged heating above 200°C. and consider this result to be the consequence of a depolymerisation taking place.

The present invention provides new heat-stable resins based on three-dimensional polyimides, which are stable towards heat stresses and which are obtained by reacting, at between 50° and 350°C., a bis-imide of the general formula:

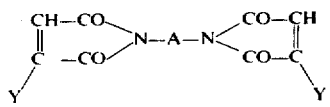    I in which the symbol Y represents H, CH₃ or Cl, and A represents a divalent organic radical possessing at least two carbon atoms, with a polyamine of the general formula:

$$R(NH_2)_x$$    II in which $x$ represents an integer at least equal to 2 and R denotes an organic radical of valency $x$, and an aldehydeazine of the general formula:

$$G - CH = N - N = CH - G$$    III (hereinafter referred to as an alazine), in which G denotes a monovalent aromatic radical, in amounts such that if $N_1$ represents the number of mols of bis-imide employed, $N_2$ represents the number of mols of polyamine employed and $N_3$ represents the number of mols of alazine employed, $$\frac{N_1}{\frac{2N_2}{x} + N_3}$$    IV is at least 1.3, $x$ being defined as above.

In formula I, the symbol A can, for example, represent a linear or branched alkylene radical having less than 13 carbon atoms, a phenylene or cyclohexylene radical, or one of the radicals of formulae:

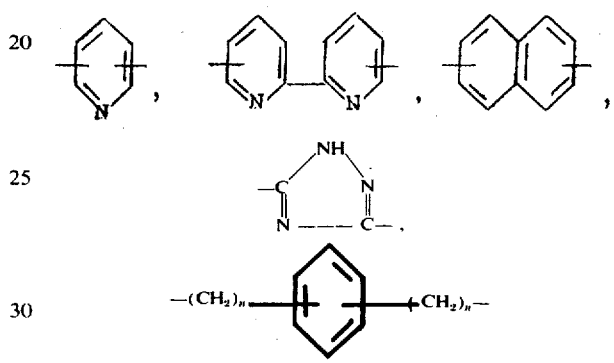

wherein $n$ represents an integer from 1 to 3 or a divalent radical with 12 to 30 carbon atoms consisting of phenylene or cyclohexylene radicals bonded to one another by a simple valency bond or by an inert atom or group such as —O—, —S—, an alkylene group with 1 to 3 carbon atoms, —CO—, —SO₂—, —NR₁—, —N=N—, —CONH—, —COO—, —P(O)R₁—, —CONH—X—NHCO—,

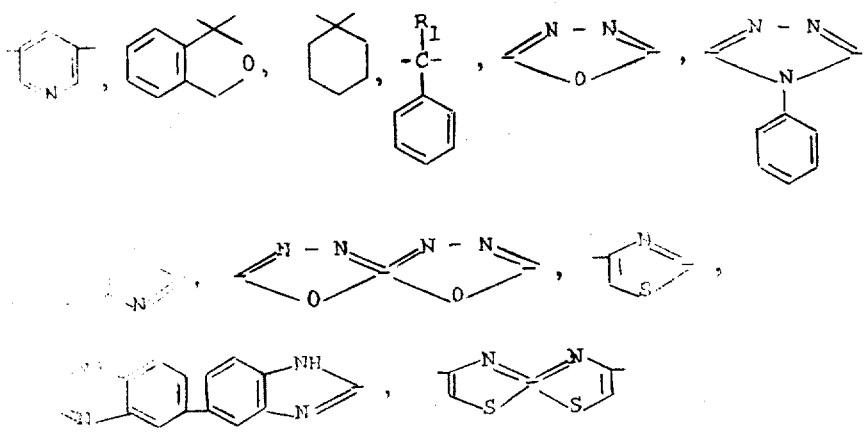

wherein $R_1$ represents a hydrogen atom, an alkyl radical with 1 to 4 carbon atoms or a phenyl or cyclohexyl radical and $x$ represents an alkylene radical with less than 13 carbon atoms. Furthermore, the various phenylene or cyclohexylene radicals can be substituted by methyl groups.

Specific examples of bis-imides (I) include: N,N'-ethylene-bis-maleimide, N,N'-hexamethylene-bis-maleimide, N,N'-meta-phenylene-bis-maleimide, N,N'-paraphenylene-bis-maleimide, N,N'-4,4'-biphenylylene-bis-maleimide, N,N'-4,4'-diphenylmethane-bis-maleimide, N,N'-4,4'-diphenyl-ether-bis-maleimide, N,N'-4,4'-diphenylsulphone-bis-maleimide, N,N'-4,4'-dicyclohexylmethane-bis-maleimide, N,N'-α,α'-4,4'-dimethylene-cyclohexane-bis-maleimide, N,N'-meta-xylylene-bis-maleimide, N,N'-para-xylylene-bis-maleimide, N,N'-4,4'-(1,1-diphenylcyclohexane)-bis-maleimide, N,N'-4,4'-diphenylmethane-bis-chloromaleimide, N,N'-4,4'-diphenylmethane-bis-citraconimide, N,N'-4,4'-(1,1-diphenyl-propane)-bis-maleimide, N,N'-4,4'-(1,1,1-triphenylethane)-bis-maleimide, N,N'-4,4'-triphenylmethane-bis-maleimide and N,N'-3,5-triazole-1,2,4-bis-maleimide. These bis-imides can be prepared according to the methods described in U.S. Pat. No. 3,018,290 and British Pat. No. 1,137,592, for example.

The polyamine (II) can be, for example, a diprimary diamine of the general formula:

$$H_2N - E - NH_2$$

V in which E represents one of the radicals which A may represent. Typical di-primary diamines which can be used include 4,4'-diamino-dicyclohexylmethane, 1,4-diaminocyclohexane, 2,6-diamino-pyridine, meta-phenylenediamine, para-phenylenediamine, 4,4'-diamino-diphenylmethane, 2,2-bis(4-aminophenyl)-propane, benzidine, 4,4'-diaminophenyl ether, 4,4'-diaminophenyl sulphide, 4,4'-diaminodiphenylsulphone, bis(4-aminophenyl)methylphosphine oxide, bis(4-aminophenyl)-phenylphosphine oxide, N,N-bis(4-aminophenyl)-methylamine, 1,5-diaminonaphthalene, meta-xylylenediamine, para-xylylenediamine, 1,1-bis(para-aminophenyl)-phthalane, hexamethylenediamine, 6,6'-diamino-2,2'-dipyridyl, 4,4'-diaminobenzophenone, 4,4'-diaminoazobenzene, bis(4-aminophenyl)-phenylmethane, 1,1-bis-(4-aminophenyl)-cyclohexane, 1,1-bis(4-amino-3-methylphenyl)-cyclohexane, 2,5-bis(m-aminophenyl)-1,3,4-oxadiazole, 2,5-bis(p-aminophenyl)-1,3,4-oxadiazole, 2,5-bis(m-aminophenyl)-thiazolo(4,5-d-)thiazole, 5,5'-di(m-aminophenyl)-(2,2')-bis(1,3,4-oxadiazolyl), 4,4'-bis(p-aminophenyl)-2,2'-dithiazole, m-bis[4-(p-aminophenyl)-2-thiazolyl]-benzene, 2,2'-bis(m-aminophenyl)-5,5'-dibenzimidazole, 4,4'-diaminobenzanilide, phenyl-4,4'-diamino-benzoate, N,N'-bis(4-aminobenzoyl)-p-phenylenediamine, 3,5-bis(m-aminophenyl)-4-phenyl-1,2,4-triazole, 4,4'-N,N'-bis(p-aminobenzoyl)-diaminodiphenylmethane, bis-p-(4-aminophenoxycarbonyl)-benzene, bis-p-(4-aminophenoxy)-benzene, 3,5-diamino-1,2,4-triazole, 1,1-bis-(4-aminophenyl)-1-phenylethane and 3,5-bis(4-aminophenyl)-pyridine.

Amongst the polyamines (II) other than the diprimary diamines, those which possess fewer than 50 carbon atoms and 3 to 5 —NH₂ groups per molecule are preferably used. The —NH₂ groups can be carried by a benzene nucleus optionally substituted by methyl groups, or by a naphthalene, pyridine or triazine nucleus; they can also be carried by several benzene nuclei linked to one another by a simple valency bond or by an inert atom or group which can be one of those described above in the definition of the symbol A, or can be

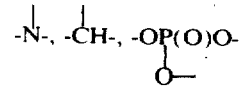

and —P(O)—. Examples of such polyamines include 1,2,4-triaminobenzene, 1,3,5-triaminobenzene, 2,4,6-triaminotoluene, 2,4,6-triamino-1,3,5-trimethylbenzene, 1,3,7-triaminonaphthalene, 2,4,4'-triaminodiphenyl-2,4,6-triaminopyridine, 2,4,4'-triaminophenyl ether, 2,4,4'-triaminodiphenylmethane, 2,4,4'-triaminodiphenylsulphone, 2,4,4'-triaminobenzophenone, 2,4,4'-triamino-3-methyldiphenylmethane, N,N,N-tri(4-aminophenyl)-amine, tri(4-aminophenyl)-methane, 4,4',4''-triaminophenyl orthophosphate, tri(4-aminophenyl)-phosphine oxide, 3,5,4'-triaminobenzanilide, melamine, 3,5,3',5'-tetraaminobenzophenone, 1,2,4,5-tetraaminobenzene, 2,3,6,7-tetraaminonaphthalene, 3,3'-diaminobenzidine, 3,3',4,4'-tetraaminodiphenylmethane, 3,3',4,4'-tetraaminodiphenylsulphone, 3,5-bis(3,4-diaminophenyl)-pyridine, and the oligomers of the formula

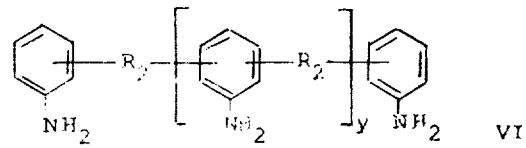

in which y represents an integer from 1 to 3 and R₂ represents a divalent hydrocarbon radical with 1 to 8 carbon atoms, which are formed during the condensation of aniline with an aldehyde or a ketone of the formula $$O = R_2$$

VII in which the oxygen atom is bonded to a carbon atom of the radical R₂; examples of such aldehydes and ketones of the formula (VII) include formaldehyde, acetaldehyde, oenanthaldehyde, benzaldehyde, acetone, methyl ethyl ketone, 2-hexanone, cyclohexanone and acetophenone.

In formula (III), the symbol G can represent, for example, a phenyl radical optionally substituted by inert atoms, radicals or groups such as F, Cl, CH₃, OCH₃ and NO₂. Amongst the alazines which can be used, there may be mentioned benzalazine, p-methoxybenzalazine, p-nitrobenzalazine and p-chlorobenzalazine.

It is to be understood that for the preparation of the resins of this invention it is possible to use a mixture of bis-imides as well as a mixture of alazines. Equally, it is obvious that the expression "polyamine" covers mixtures of polyamines of the same functionality, or mixtures of polyamines having different functionalities. Generally, one or more di-primary diamines are used, optionally in combination with one or more polyamines of higher functionality which can generally represent, by weight, up to 50% of the weight of the diamine employed. Preferably, the amounts of the reactants are chosen so that the ratio (IV) is between 1.5 and 10. The amounts of polyamine and of alazine are generally so chosen that $$\frac{x\ N_3}{2\ N_2} \qquad \text{VIII}$$

is between 0.05 and 20, preferably between 0.1 and 10, $x$, $N_2$ and $N_3$ being as defined above.

The preparation of the resins of this invention is advantageously carried out in two stages. In the first stage, a prepolymer (PP) is prepared, which can be shaped as a solution, a suspension, a powder or a liquid mass.

The prepolymers can be prepared in bulk by heating the mixture of reactants until a homogeneous liquid is obtained. The temperature can vary within rather wide limits as a function of the nature and number of reactants present but is generally between 50° and 180°C. It is advantageous to homogenise the mixture beforehand if the reactants have a relatively high melting point.

The preparation of the prepolymers can also be effected by heating the reactants in a polar solvent such as dimethylformamide, N-methylpyrrolidone, dimethylacetamide, N-methylcaprolactam, diethylformamide or N-acetylpyrrolidone, at a temperature which is generally between 50° and 180°C. The solutions of prepolymers can be used, as they are, for numerous applications; it is also possible to isolate the prepolymer from its solution by precipitation with a diluent which is miscible with the polar solvent and does not dissolve the prepolymer, such as water or a hydrocarbon having a boiling point which does not significantly exceed 120°C.

According to a particular embodiment, the prepolymer (PP) can be prepared from the alazine and a prepolymer (P₁) obtained by heating a mixture of bis-imide and polyamine. It is also possible first to prepare a prepolymer (P₂) by heating a mixture of the alazine and bis-imide and then to combine it with the polyamine so as to give the prepolymer (PP).

Regardless of the method adopted, the preparation of the prepolymers can be carried out in the presence of a strong acid catalyst. By "strong acid" as used herein is meant an acid in the Bronsted sense which is a monoacid or polyacid of which at least one group has an ionisation constant (pKa) less than 4.5. Thus they can be inorganic acids such as hydrochloric, sulphuric, nitric or phosphoric acid, optionally substituted by an organic radical, such as sulphonic and phosphonic acids. The acids can also be carboxylic acids which can contain groups which do not interfere with the reaction between the bis-imide, the polyamine and the alazine. The preferrd acid is maleic acid. Generally, from 0.5 to 5% by weight relative to the weight of the bis-imide (1) of acid are employed.

The prepolymers can be used as a liquid mass, with simple hot casting sufficing to shape them. It is also possible to cool and grind them and then to use them in the form of powders which are remarkably suitable for compression moulding operations, optionally in the presence of fillers in the form of, for example, powders, spheres, granules, fibres or flakes. In the form of suspensions or solutions, the prepolymers can be used for producing coatings and intermediate pre-impregnated articles, the reinforcement consisting of, for example, fibrous materials based on aluminium silicate, aluminium oxide, zirconium silicate, zirconium oxide, carbon, graphite, boron, asbestos or glass.

In the second stage, the prepolymers can be cured by heating to temperatures of the order of 350°C, and generally between 150° and 300°C; a supplementary shaping can be effected during curing, optionally in vacuo or under super-atmospheric pressure; these processes can also be carried out consecutively. The curing can be effected in the presence of a radical polymerisation initiator such as lauroyl peroxide or azo-bis-isobutyronitrile or an anionic polymerisation catalyst such as diazabicyclooctane.

For the preparation of the resins intended more particularly for the manufacture of compression-moulded articles, an alternative procedure consists of curing, under the conditions indicated above, a mixture of a prepolymer (PP₁) obtained from a part of the bis-imide and from the polyamine, and a prepolymer (PP₂) obtained from the alazine and the remainder of the bis-imide. If the number of mols of bis-imide used for the preparation of the prepolymers (PP₁) and (PP₂) are respectively denoted by $n_2$ and $n_3$, amounts of bis-imide are preferably employed such that, with the amounts of polyamine and alazine being selected beforehand, the ratio $$\frac{x\ n_2}{2\ N_2}$$

is at least equal to 1.2, and the ratio $$\frac{n_3}{N_3}$$

is at least equal to 2.2, $x$, $N_2$ and $N_3$ being as indicated above. The prepolymers (PP₁) and (PP₂) can be prepared by applying the methods described above for producing the prepolymer (PP). In the following description, it is to be appreciated that mixtures of prepolymers (PP₁) and (PP₂) are also described as prepolymers (PP).

The resins according to the invention can contain, by way of an adjuvant, an aromatic compound (AR) containing 2 to 4 benzene rings, which is not sublimable at atmospheric pressure up to 250° and which has a boiling point above 250°; the addition of these aromatic compounds generally contributes to a lowering of the softening point of the prepolymers. In these aromatic compounds, the benzene rings can form condensed nuclei or be joined to one another by a valency bond or by an inert atom or group such as

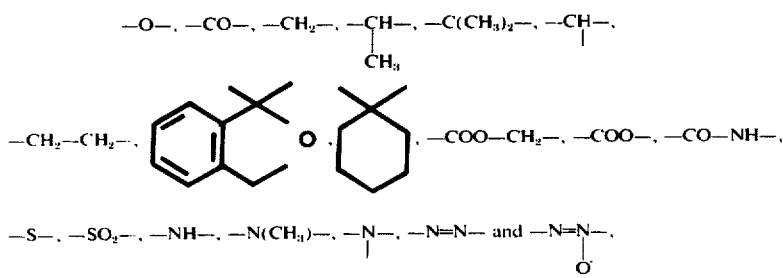

or a combination of these various types of linkage can be present (in a single compound). The benzene rings can be substituted by inert radicals such as —CH₃, —OCH₃, —F, —Cl and —NO₂. By way of examples, there may especially be mentioned the isomeric terphenyls, the chlorinated diphenyls, phenyl ether, 2,2'-naphthyl ether, o-methoxyphenyl ether, benzophenone, 2,5,4'-treimethylbenzophenone, p-phenylbenzophenone, p-fluorobenzophenone, diphenylamine, diphenylmethylamine, triphenylamine, azobenzene, 4,4'-dimethylazobenzene, azoxybenzene, diphenylmethane, 1,1-diphenylethane, 1,1-diphenylpropane, triphenylmethane, diphenylsulphone, phenylsulphide, 1,2-diphenylethane, p-diphenoxybenzene, 1,1-diphenylphthalane, 1,1-diphenylcyclohexane, phenyl benzoate, benzyl benzoate, p-nitrophenyl terephthalate and benzanilide. These aromatic adjuvants can be used in amounts up to about 10% by weight relative to the weight of prepolymer (PP) or to the total weight of the starting materials. The adjuvant (AR) can be added to the prepolymer (PP) or be introduced into the mixture at any time during its preparation.

The mechanical properties of the resins intended to withstand long-term heat tests can be improved by incorporation of an anhydride of a tricarboxylic or tetracarboxylic aromatic acid. These can be monoanhydrides such as those of the general formula

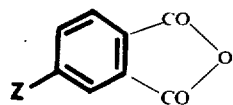 IX in which the symbol Z can represent a group such as

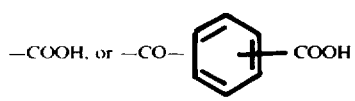

Specific monoanhydrides, which may be mentioned, include trimellitic anhydride and the anhydride of benzophenone-3,4,4'-tricarboxylic acid. The anhydrides can also be dianhydrides such as pyromellitic anhydride or a dianhydride of the general formula

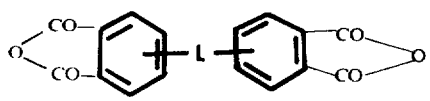 X in which the symbol L can represent a divalent radical such as

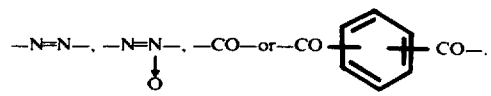

Amongst these latter dianhydrides, there may more particularly be mentioned azophthalic anhydride and the dianhydrides of m- or p-bis(3,4-dicarboxybenzoyl)-benzene. The anhydride is advantageously incorporated into the prepolymer (PP) in an amount of the order of 1 to 5% by weight relative to the weight of the prepolymer.

The resins of this invention can also be modified by the addition, before curing, of a monomer (M) other than a bis-imide, containing at least one polymerisable —CH = C< group which can be of the vinyl, maleic, allyl and acrylic type. The monomers (M) can possess several —CH = C< groups provided the double bonds are not in a conjugated position. In one and the same monomer, these groups can belong to the same or different types. It is thus possible to use a monomer of a given formula or a mixture of copolymerisable monomers.

The monomers which may be used are generally esters, ethers, hydrocarbons, substituted heterocyclic derivatives, organometallic compounds or organometalloid compounds.

Suitable esters include vinyl, allyl, methallyl, 1-chloroallyl, crotyl, isopropenyl and cinnamyl esters derived from saturated or unsaturated aliphatic, or aromatic, monocarboxylic or polycarboxylic acids, such as formic, acetic, propionic, butyric, oxalic, malonic, succinic, adipic, sebacic, acrylic, methacrylic, phenylacrylic, crotonic, maleic, fumaric, itaconic, citraconic, tetrahydrophthalic, acetylene-dicarboxylic, benzoic, phenylacetic, ortho-phthalic, terephthalic and isophthalic acid, as well as the esters of non-polymerisable alcohols such as the methyl, isopropyl, 2-ethyl-hexyl and benzyl esters derived from polymerisable acids such as those mentioned above. Typical examples of such esters are vinyl acetate, allyl acetate, methyl acrylate and methacrylate, vinyl methacrylate, alkyl maleate, allyl fumarate, allyl phthalate, allyl malonate and allyl trimellate.

Suitable ethers include vinyl allyl ether, allyl ether, methallyl ether, allyl crotyl ether and vinyl phenyl ether and suitable substituted heterocyclic derivatives include the vinylpyridines, N-vinylpyrrolidone, N-vinylcarbazole, allyl isocyanurate, vinyltetrahydrofurane, vinyldibenzofurane, allyloxtetrahydrofurane and N-allylcaprolactam.

It is also possible to use hydrocarbons such as styrene, alpha-methylstyrene, vinylcyclohexane, 4-vinylcyclohexene, divinylbenzene, divinylcyclohexane, diallylbenzene and vinyltoluene.

Amongst the monomeric organometallic and organometalloid derivatives there should be mentioned especially those which contain one or more atoms of phosphorus, boron or silicon. These can be silanes or siloxanes, phosphines, phosphine oxides or phosphine sulphides, phosphates, phosphites, phosphonates, boranes, orthoborates, boronates, boroxoles, borazoles and phosphazenes. Examples include vinyloxytrimethylsilane, 1,3-diallyl-tetramethyl-disiloxane, allyl dimethylphosphine oxide, allyl orthophosphate, allyl methylphosphonate, methyl para-vinylphenylboronate, triallylborazole, triallylboroxole, triallyltrichlorophosphazene, allyl phosphate and allyl allylphosphonate.

Furthermore, the monomers indicated above can contain halogen atoms, especially chlorine or fluorine atoms, or functional groups such as an alcoholic or phenolic hydroxyl group or a carbonyl, aldehyde or ketone, amido, epoxy or nitrile group. Examples of suitable monomers (M) which contain such substituents include allyloxyethanol, p-allyl-oxyphenol, tetraallylepoxyethane, glycidyl acrylate, glycidyl methacrylate, allyl glycidyl ether, 4-vinylepoxycyclohexane, p-cyanostyrene, acrylamide, N-methacrylamide, N-allylacrylamide, N-methylolacrylamide, methyl vinyl ketone, methyl allyl ketone, acrylonitrile, methyl acrylonitrile, p-chlorostyrene and p-fluorostyrene.

The monomer (M) can be added to the prepolymer (PP) or be introduced into the mixture at any time during its preparation. The amount used should generally be chosen so that it represents less than 50%, preferably from 5 to 40%, of the weight of prepolymer (PP) or of the total weight of the starting reactants. The curing of the prepolymer modified with a monomer (M) can be effected under the same conditions as for the curing of the unmodified prepolymer.

The resins of this invention can also be modified by the addition of an unsaturated polyester prior to curing. The unsaturated polyesters which can be used are well-known products. They are usually prepared by polycondensation of polycarboxylic derivatives and polyols at least one containing olefinic unsaturation; by polycarboxylic derivatives there are meant acids, esters of lower alcohols, acid chlorides and, where relevant, anhydrides. Preferred unsaturated polyesters are diacids or dianhydrides possessing a double bond of the olefinic type in the α,β-position. By way of examples, the dicarboxylic derivatives can be of the maleic, chloromaleic, itaconic, citraconic, aconitic, pyrocinchonic, fumaric, chlorendic, endomethylene-tetrahydrophthalic, tetrahydrophthalic, ethylmaleic, succinic, sebacic, phthalic, isophthalic, adipic and hexahydrophthalic type. The most commonly used polyols include ethylene glycol, propylene glycol, diethylene glycol, triethylene glycol, neopentylglycol, tetraethylene glycol, butylene glycol, dipropylene glycol, glycerol, trimethylolpropane, pentaerythritol, sorbitol and 3,3-bis-hydroxymethylcyclohexene.

The term "unsaturated polyester" also covers solutions of the polycondensates described above in a monomer (M') which is capable of copolymerisation with them. These monomers are also well-known in polyester technology; typical examples include sytrene, alpha-methylstyrene, vinyltoluene, p-(alpha-methylvinyl)-benzophenone, divinylbenzene, vinyl 2-chloroethyl ether, N-vinylpyrrolidone, 2-vinylpyridine, indene, methyl acrylate, methyl methacrylate, acrylamide, N-t.butyl-acrylamide, acrylonitrile, hexahydro-1,3,5-triacrylo-s-triazine, allyl phthalate, allyl fumarate, allyl cyanurate, allyl phosphate, diethylene glycol diallylcarbonate, allyl lactate, allyl malonate, allyl tricarballylate, allyl trimesate and allyl trimellate. If the monomer (M') is used, it generally represents from 10% to 60% of the weight of the solution of unsaturated polyester.

The unsaturated polyesters can be prepared by applying knwn methods; on this subject, reference may be made, for example, to KIRK-OTHMER: Encyclopedia of Chemical Technology, 2nd edition, volume 20.

The details relating to the introduction and amounts of unsaturated polyester as well as to the curing to give resins are identical to those which have been mentioned above in connection with the addition of a monomer (M).

The incorporation of a monomer (M) or of an unsaturated polyester gives curable mixtures which can be used as impregnating resins; after addition of fillers they can be used as coating compositions.

The resins according to the invention are of value in industries which require materials possessing good mechanical and electrical properties as well as high chemical inertness at temperatures of 200° to 300°C. By way of example, they are very suitable for the manufacture of insulating sheets or tubes for electrical transformers, and the manufacture of printed circuits, gears and sefl-lubricating collars and bearings.

The following Examples further illustrate the present invention.

EXAMPLE 1

71.6 g. of N,N'-4,4'-diphenylmethane-bis-maleimide, 3.34 g. of benzalazine and 12.7 g. of 4,4'-diamino-diphenylmethane are intimately mixed. The mixture is thereafter spread on a metal plate and kept for 45 minutes in a chamber heated to 145°C., and then for 14 hours at 130°C.

After cooling, the prepolymer is finely ground (particle diameter less than 100μ); a powder of softening point 140°C. is obtained, 25 g. of this powder are introduced into a cylindrical mould (diameter: 76 mm.) which is placed between the platens of a press which have beforehand been heated to 250°C. The whole is kept at this temperature for 1 hour under a pressure of 200 bars. After release from the mould whilst hot, the article is subjected to a supplementary heat treatment at 250°C. for 24 hours. After cooling, it has a flexural breaking strength of 15.6 kg./mm² (span: 25.4 mm) at 25°C. After a heat test lasting 1,000 hours at 250°C., this strength is still 14.8 kg./mm².

EXAMPLE 2

A prepolymer is prepared by heating the mixture of the reactants described in Example 1 to 150°C. for 50 minutes.

After cooling and grinding, a powder of softening point 115°C. is obtained.

a. 28 g. of powder are introduced into 40 g. of water with vigorous stirring. A sample (30 cm. × 45 cm.) of a satin type glass fabric having a specific weight of 308 g./m² is impregnated with the suspension thus prepared; this fabric was beforehand subjected to thermal desizing followed by treatment with γ-aminopropyltriethoxysilane. The coated fabric is thereafter dried at 140°C. for 25 minutes in a ventilated atmosphere. 12 samples (10 cm. × 11 cm.) are cut from this pre-impregnated fabric and are stacked with the weft and warp alternating. The stack is thereafter placed between the platens of a press preheated to 130°C. and a pressure of 40 bars is applied. The temperature is now progressively raised to 250°C. over the course of 30 minutes. During cooling the laminate is released when the temperature reaches 150°C. and is then subjected to a supplementary heat treatment lasting 24 hours at 250°C. After cooling, it has a flexural breaking strength of 50.3 kg./mm$^2$ (span : 50 mm.) at 25°C. After a heat exposure lasting 200 hours at 300°C., this strength is still 29 kg./mm$^2$.

b. 12.5 g. of a prepolymer powder are taken and 12.5 g. of short glass fibres (length : 3 mm.) are incorporated therein. A moulding is thereafter produced with this filled prepolymer under the conditions described in Example 1. The moulded article has a flexural breaking strength of 16.3 kg./mm$^2$ at 25°C. After a heat exposure of 500 hours at 250°C. this strength is still 12 kg./mm$^2$.

EXAMPLE 3

72 g. of N,N'-4,4'-diphenyl-ether-bis-maleimide, 6.67 g. of benzalazine and 9.6 g. of 4,4'-diamino-diphenylether are intimately mixed. The mixture is thereafter spread on a metal plate and is then kept in a chamber at 165°C. for 40 minutes.

After cooling, the prepolymer is ground and the powder obtained is heated to 130°C. for 17 hours. This powder now has a softening point of 153°C. 25 g. thereof are taken and moulded under the conditions described in Example 1. The moulded article has a flexural breaking strength of 12 kg./mm$^2$ at 25°C. After a heat exposure lasting 1,540 hours at 250°C. this strength is still 7.8 kg./mm$^2$.

EXAMPLE 4

A prepolymer is prepared by heating a mixture obtained from 32.2 g. of N,N'-4,4'-diphenylmethane-bis-maleimide, 1.25 g. of benzalazine and 10.7 g. of 4,4'-diamino-diphenylmethane at 145°C. for 49 minutes. This prepolymer softens at 158°C. A moulded article is thereafter prepared under the conditions described in Example 1, the duration of the supplementary heat treatment being, however, 48 hours. The moulded article has a flexural breaking strength of 4.2 kg./mm$^2$ at 250°C.

EXAMPLE 5

35.8 g. of N,N'-4,4'-diphenylmethane-bis-maleimide, 6.67 g. of benzalazine, 1.59 g. of 4,4'-diamine-diphenylmethane, 0.36 g. of maleic acid and 72mg. of diazabicyclooctane are intimately mixed. This mixture is thereafter heated to 150°C. for 35 minutes. After grinding the prepolymer has a softening point of 192°C. 25g. thereof are taken and moulded under the conditions described in Example 1, the duration of the supplementary heat treatment being, however, 60 hours. The moulded article has a flexural breaking strength of 9.1 kg./mm$^2$ at 250°C. After a heat exposure lasting 840 hours at 250°C. this strength reaches 10.3 kg./mm$^2$.

EXAMPLE 6 a. A prepolymer (PP1) is prepared by heating a mixture obtained from 71.6 g. of N,N'-4,4'-diphenylmethane-bis-maleimide and 17.82 g. of 4,4'-diamino-diphenylmethane at 160°C. for 30 minutes. After cooling, the prepolymer is finely ground.

b. 83.25 g. of benzalazine are dissolved in 294 g. of dimethylformamide and the solution is then heated to 130°C. 358 g. of N,N'-4,4'-diphenylmethane-bis-maleimide are then introduced and the whole is thereafter kept at 130°C. for 2 hours 30 minutes. After cooling, the solution is introduced, over the course of 5 minutes, into 1.2 l. of vigorously stirred water; a precipitate forms, which is washed with four 250 cm$^3$ portions of water at 70°C. After drying at 60°C. under 3 mm. of mercury, 429 g. of a prepolymer powder (PP2) having a softening point of 152°C. are obtained.

c. 10 g. of prepolymer (PP1) and 15 g. of prepolymer (PP2) are intimately mixed and this mixture is used to produce a moulded article under the conditions described in Example 1. The duration of the supplementary heat treatment is 60 hours. The moulded article has a flexural breaking strength of 10.8 kg./mm$^2$ at 25°C. After a heat exposure of 840 hours at 250°C., this strength remains unchanged.

d. A moulding is produced under the conditions described under (c) but using 20 g. of prepolymer (PP1) and 5 g. of prepolymer (PP2). The moulded article has a flexural breaking strength of 13.2 kg./mm$^2$ at 25°C. After a heat exposure lasting 840 hours at 250°C., this strength is still 11.7 kg./mm$^2$.

EXAMPLE 7

A prepolymer is prepared by heating a mixture consisting of 35.8 g. of N,N'-4,4'-diphenylmethane-bis-maleimide, 6.67 g. of benzalazine and 1.59 g. of 4,4'-diamino-diphenylmethane at 150°C. for 28 minutes. After cooling and grinding, 25 g. of the prepolymer are taken and introduced into the mould described in Example 1. The mould is placed between the platens of a press which has previously been heated to 250°C. and the whole is kept at this temperature for 1 hour under a pressure of 250 bars. After release from the mould whilst hot, the article is subjected to a supplementary heat treatment lasting 24 hours at 250°C. After cooling, it has a flexural breaking strength of 11.4 kg./mm$^2$ at 25°C. This strength remains unchanged after a heat exposure lasting 500 hours at 300°C.

EXAMPLE 8

A mixture consisting of 43 g. of N,N'-4,4'-diphenylmethane-bis-maleimide, 1.52 g. of benzalazine, 6.5 g. of terphenyl and 6.5 g. of allyl phthalate is kept at 140°C. for 25 minutes under reduced pressure (1 mm. of mercury) and 7.6 g. of 4,4'-diamino-diphenylmethane are then introduced into the mixture. The whole is stirred for 10 minutes at 140°C. and the pre-polymer obtained is then cast in a parallelepiped mould (125 mm. × 75 mm. × 6 mm.) previously heated to 180°C. The mould is thereafter heated at 200°C. for 16 hours. After release from the mould whilst hot, the article is subjected to a supplementary heat treatment at 250°C. for 30 hours. It has a flexural breaking strength of 16.3 kg./mm$^2$ at 25°C.

The terphenyl used in this Example contains, by weight, 13% of ortho-isomer, 62% of meta-isomer and 25% of para-isomer.

EXAMPLE 9

A prepolymer is prepared as described in Example 1 from 71.6 g of N,N'-4,4'-diphenylmethane-bis-maleimide, 3.34 g of benzalazine and 12.7 g of diamino-diphenylmethane. 25 g of the powdered prepolymer are heated and then intimately mixed with 1 g of the di-anhydride of para-bis(3,4-dicarboxybenzoyl)benzene.

The powder obtained is introduced into a cylindrical mould (diameter 76 mm) which is then placed between the platens of a press previously heated to 250°C. When the temperature of the mould reaches 160°C., a pressure of 200 bars is applied and the whole kept for 1 hour under this pressure.

After release from the mould whilst hot, the article is subjected to a supplementary heat-treatment at 250°C. for 24 hours. After cooling, it has a flexural breaking strength of 16.1 kg/mm² at 25°C. After a heat test lasting 960 hours at 250°C., this strength is still 15.3 kg/mm².

I claim:

1. A heat-stable resin consisting essentially of the three-dimensional polyimide obtained by reacting at between about 50° and 350°C. at least one reactant from each of the following four groups:

i. a bis-imide of the general formula:

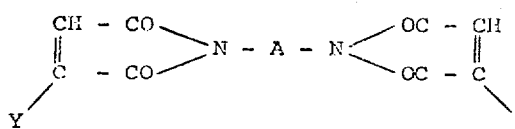

in which Y denotes H, CH₃ or Cl, and A represents a linear or branched alkylene radical having less than 13 carbon atoms, a phenylene or cyclohexylene radical or one of the radicals of formulae:

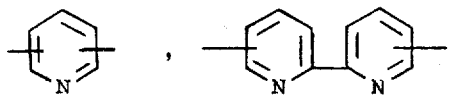

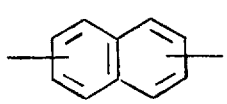 , 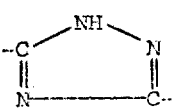 ,

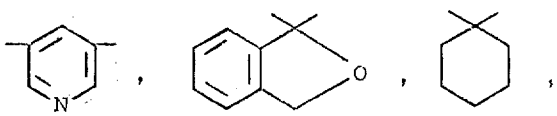

or wherein n represents an integer from 1 to 3 or a divalent radical with 12 to 30 carbon atoms consisting of phenylene or cyclohexylene radicals bonded to one another by a simple valency bond or by —O—, —S—, an alkylene group with 1 to 3 carbon atoms, —CO—, —SO₂—, —NR₁—, —N=N—, —CONH—, —COO—, —P(O)R₁—, —CONH—X—NHCO—,

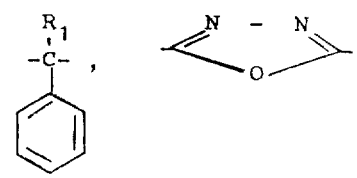

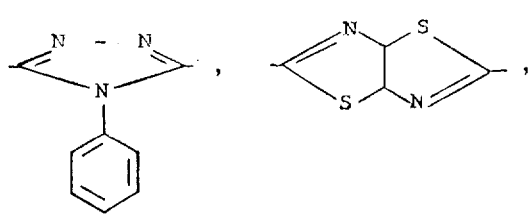

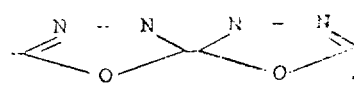

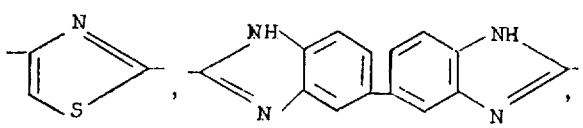

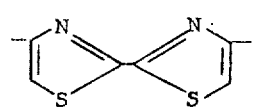

wherein R₁ represents a hydrogen atom, an alkyl radical with 1 to 4 carbon atoms or a phenyl or cyclohexyl radical and X represents an alkylene radical with less than 13 carbon atoms, ii. a polyamine of the general formula:

R (NH₂)ₓ in which x represents an integer from 2 to 5 and R denotes an organic radical of valency x, and selected from the group consisting a 3 to 5 valent benzene, methylbenzene, naphthalene, pyridine or triazine radical, a 3 to 5 valent radical consisting of phenylene radicals bonded to one another by a simple valency bond or by —O—, —S—, an alkylene group with 1 to 3 carbon atoms, —CO—, —SO₂—, NR₁—, —N=N—, —CONH—, —COO—, —P(O)R₁—, —CONH—X—NHCO—,

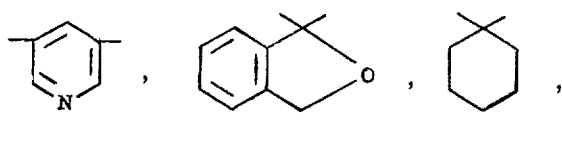 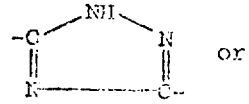 or

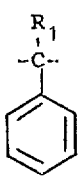 

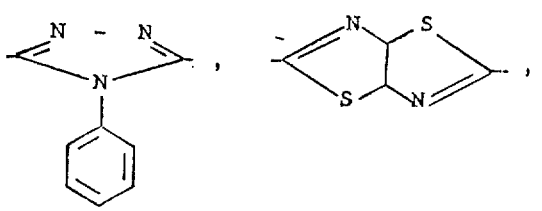

wherein n represents an integer from 1 to 3 or a divalent radical with 12 to 30 carbon atoms consisting of phenylene or cyclohexylene radicals bonded to one another by a simple valency bond or by —O—, —S—, an alkylene group with 1 to 3 carbon atoms, —CO—, —SO$_2$—, —NR$_1$—, —N=N—, —CONH—, —COO—, —P(O)R$_1$—, —CONH—X—NHCO—,

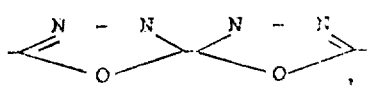

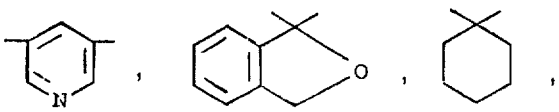

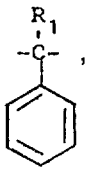 

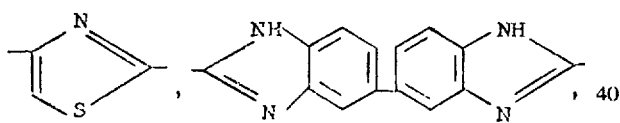

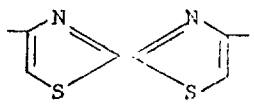

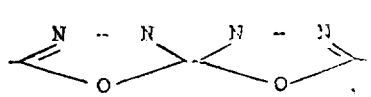

wherein R$_1$ represents a hydrogen atom, an alkyl radical with 1 to 4 carbon atoms or a phenyl or cyclohexyl radical and X represents an alkylene radical with less than 13 carbon atoms,

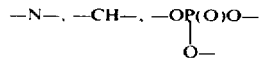

and —P(O)—, a linear or branched alkylene radical having less than 13 carbon atoms, a phenylene or cyclohexylene radical or one of the radicals of the formulae:

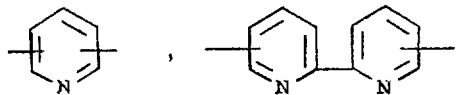 

wherein $R_1$ represents a hydrogen atom, an alkyl radical with 1 to 4 carbon atoms or a phenyl or cyclohexyl radical and iii. an alazine of the general formula:

$$G — CH = N — N = CH — G$$

in which G represents a monovalent carboxyclic aromatic radical, and iv. up to 5% by weight relative to the weight of (i), (ii) and (iii) of an anhydride of a tricarboxylic or tetracarboxylic aromatic carbocyclic acid, in amounts such that if $N_1$ represents the number of mols of bis-imide employed, $N_2$ represents the number of mols of polyamine employed and $N_3$ represents the number of mols of alazine employed, the ratio $$\frac{N_1}{\frac{2N_2}{x} + N_3}$$

is from 1.3 to 10, $x$ being defined as above.

2. The resin according to claim 1 in which the polyamine is a di-primary diamine of the general formula:

$$NH_2 — E — NH_2$$

in which E represents a linear or branched alkylene radical having less than 13 carbon atoms, a phenylene or cyclohexylene radical, or one of the radicals of formulae:

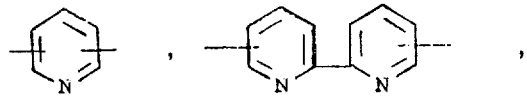

wherein $n$ represents an integer from 1 to 3 or a divalent radical with 12 to 30 carbon atoms consisting of phenylene or cyclohexylene radicals bonded to one another by a simple valency bond or by —O—, —S—, an alkylene group with 1 to 3 carbon atoms, —CO—, —SO$_2$—, —NR$_1$—, —N=N—, —CONH—, —COO—, —P(O)R$_1$—, —CONH—X—NHCO—,

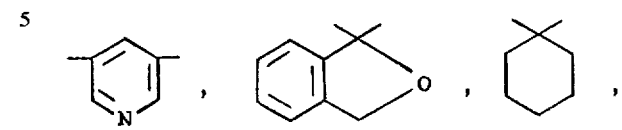

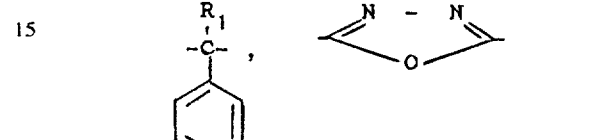

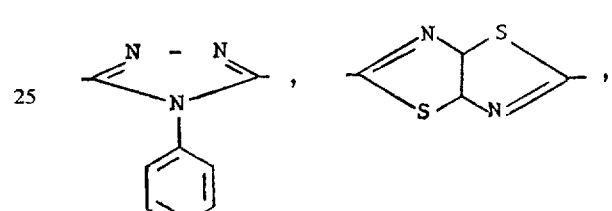

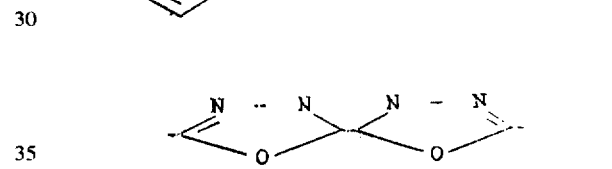

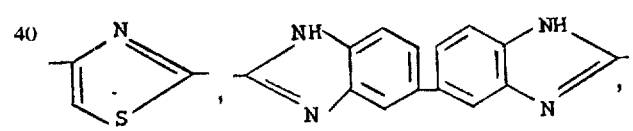

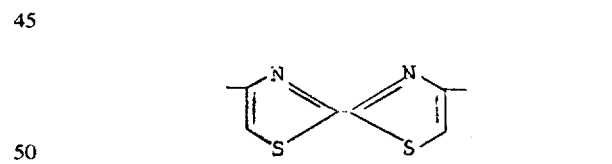

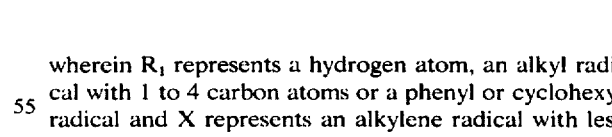

wherein $R_1$ represents a hydrogen atom, an alkyl radical with 1 to 4 carbon atoms or a phenyl or cyclohexyl radical and X represents an alkylene radical with less than 13 carbon atoms.

3. The resin according to claim 1 in which at least one of A and E represents:

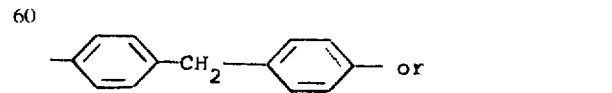

4. The resin according to claim 1 in which G denotes a phenyl radical.

5. The resin according to claim 1 in which $$\frac{x N_3}{2 N_2}$$

is between 0.05 and 20.

6. The resin according to claim 1 which is obtained by preparing a shapable, heat-curable prepolymer by heating between about 50° and 180°C. a mixture of the bis-imide, polyamine and alazine in bulk until a homogeneous liquid is obtained, or in a polar solvent, adding the anhydride in an amount from 1 to 5% of the weight of the prepolymer, and then curing by subsequent heating at between about 150° and 300°C.

7. The resin according to claim 1 which is obtained by preparing a shapable, heat-curable prepolymer (PP) from the alazine and a shapable, heat-curable prepolymer ($P_1$) obtained from the bis-imide and the polyamine, adding the anhydride in an amount from 1 to 5% of the weight of the prepolymer, and then curing by subsequent heating at between about 150° and 300°C.

8. The resin according to claim 1 which is obtained by preparing a shapable, heat-curable prepolymer (PP) from the polyamine and from a shapable, heat-curable prepolymer ($P_2$) obtained from the alazine and the bis-imide, adding the anhydride in an amount from 1 to 5% of the weight of the prepolymer, and then curing the prepolymer by subsequent heating at between about 150° and 300°C.

9. The resin according to claim 1 which is obtained by preparing a shapable, heat-curable prepolymer (PP) by mixing a shapable, heat-curable prepolymer ($PP_1$) obtained from a part of the bis-imide and from the polyamine with a shapable, heat-curable prepolymer ($PP_2$) obtained from the alazine and the remainder of the bis-imide, adding the anhydride in an amount from 1 to 5% of the weight of the prepolymer, and then curing the prepolymer by subsequent heating at between about 150° and 300°C.

10. The resin according to claim 1 in which the anhydride has the general formula:

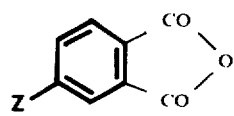

in which the symbol Z represents a group selected from —COOH and

11. The resin according to claim 10 in which the anhydride is trimellitic anhydride or the anhydride of benzophenone-3,4,4'-tricarboxylic acid.

12. The resin according to claim 1 in which the anhydride has the general formula:

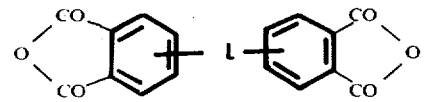

in which the symbol L represents

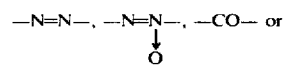

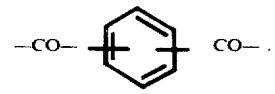

13. The resin according to claim 12 in which the anhydride is azophthalic anhydride or the dianhydride of m- or p-bis(3,4-dicarboxybenzoyl)-benzene.

14. The resin according to claim 1 in which the anhydride is pyromellitic anhydride.

15. The resin according to claim 1 in which before curing up to about 10% by weight relative to the weight of (i), (ii) and (iii) of an aromatic compound possessing 2 to 4 benzene rings which is not sublimable under atmospheric pressure up to about 250°C. and which has a boiling point above about 250°C. is incorporated.

16. The resin according to claim 15 in which the aromatic compound is a terphenyl.

17. A shapable, heat-curable thermosetting prepolymer composition obtained by heating between about 50° and 180°C. a mixture of a bis-imide, polyamine, alazine and anhydride, all as defined in claim 1, in the amounts specified in claim 1 until a homogeneous liquid is obtained.

18. A shapable, heat-curable prepolymer composition according to claim 17 obtained by heating a mixture of a bis-imide, polyamine, alazine and anhydride all as defined in claim 1, in the amounts specified in claim 1, in a polar solvent.

19. A shapable, heat-curable prepolymer composition obtained from an alazine as defined in claim 1, a shapable, heat-curable prepolymer ($P_1$) obtained from bis-imide and polyamine as defined in claim 1, and up to 5% by weight relative to the weight of the alazine and prepolymer of an anhydride as defined in claim 1.

20. A shapable, heat-curable prepolymer composition obtained from a polyamine as defined in claim 1, a shapable, heat-curable prepolymer ($P_2$) obtained from alazine and bis-imide as defined in claim 1, and up to 5% by weight relative to the weight of the polyamine and prepolymer of an anhydride as defined in claim 1.

21. A shapable, heat-curable prepolymer composition obtained by mixing a shapable, heat-curable prepolymer ($PP_1$) obtained from a part of the bis-imide and from the polyamine, as defined in claim 1, with a shapable, heat-curable prepolymer ($PP_2$) obtained from the remainder of the bis-imide and from an alazine as defined in claim 1, and up to 5% by weight relative to the weight of the prepolymer ($PP_1$) and prepolymer ($PP_2$) of an anhydride as defined in claim 1.

22. The resin according to claim 1 in which G denotes a phenyl radical substituted by a fluorine, chlorine, methyl, methoxy, or nitro group.

* * * * *

UNITED STATES PATENT OFFICE
CERTIFICATE OF CORRECTION

Patent No. 3,910,859  Dated October 7, 1975

Inventor(s) Michel BARGAIN

It is certified that error appears in the above-identified patent and that said Letters Patent are hereby corrected as shown below:

Under the section entitled "RELATED U.S. APPLICATION DATA", and before the section numbered "[52]", please insert the following:

--FOREIGN APPLICATION PRIORITY DATA

February 27, 1971  France. . . . . . 71 06289--.

Signed and Sealed this sixth Day of April 1976

[SEAL]

Attest:

RUTH C. MASON
Attesting Officer

C. MARSHALL DANN
Commissioner of Patents and Trademarks